Figure 1:
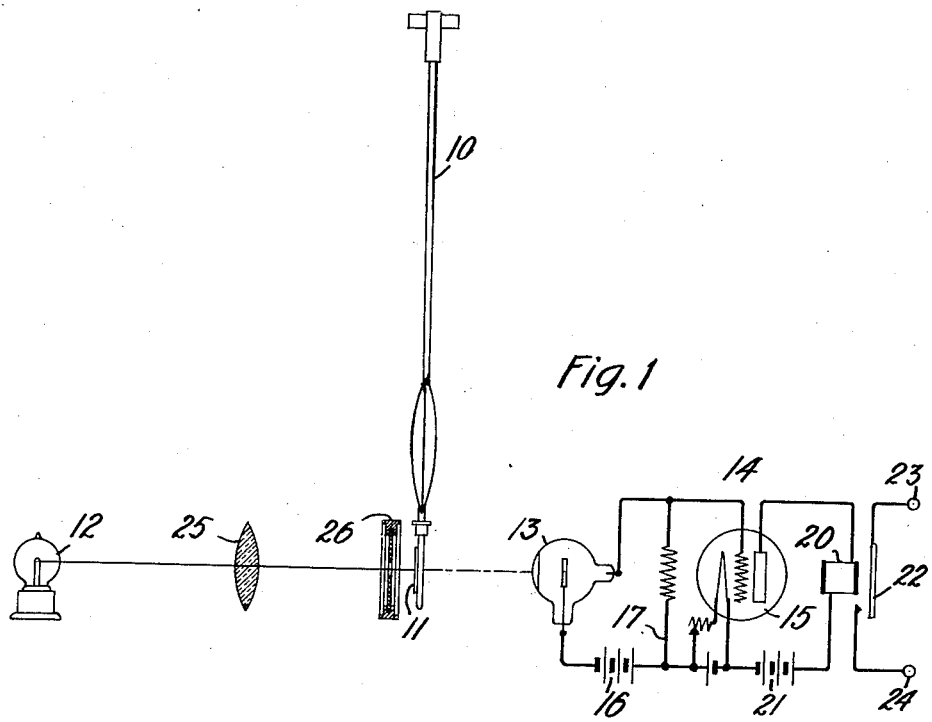

Dec. 15, 1925.

H. C. SNOOK 1,565,596

SIGNAL SYSTEM

Filed Nov. 15, 1923

Inventor:
Homer C. Snook
by C.W. Adams Att'y

Patented Dec. 15, 1925.

1,565,596

UNITED STATES PATENT OFFICE.

HOMER C. SNOOK, OF SOUTH ORANGE, NEW JERSEY, ASSIGNOR TO WESTERN ELECTRIC COMPANY, INCORPORATED, OF NEW YORK, N. Y., A CORPORATION OF NEW YORK.

SIGNAL SYSTEM.

Application filed November 15, 1923. Serial No. 674,901.

*To all whom it may concern:*

Be it known that I, HOMER C. SNOOK, a citizen of the United States of America, residing at South Orange, in the county of Essex and State of New Jersey, have invented certain new and useful Improvements in Signal Systems, of which the following is a full, clear, concise, and exact description.

This invention relates to signal systems.

An object of this invention is to produce a succession of electrical impulses occurring at equal intervals of time.

Another object is to produce electrical pulses at equal time intervals and of equal time duration.

A further object of the invention is to control the duration of the electrical pulses in a succession and the time intervals therebetween by means of a pendulum.

Another object of the invention is to produce electrical pulses indicative of equal time intervals and to control these pulses by means of a standard clock through the medium of light beams.

A further object of the invention is to control electrical pulses in accordance with the simple harmonic motion of a body.

A feature of this invention relates to means for controlling electrical impulses, which means utilize the action of a beam of light.

A further feature of the invention relates to means comprising a standard clock for controlling electrical impulses without the use of electrical or mechanical contacts.

Another feature of the invention concerns the production of electrical impulses in accordance with variations of a beam of light impressed upon a photo-electric cell.

In order to obtain electrical pulses succeeding one another at equal time intervals, an oscillating pendulum, which may be maintained in motion by means of a standard clock mechanism, carries an opaque body that periodically intercepts a beam of light. A photo-electric cell placed in the path of the light beam is connected to a thermionic amplifier in such manner that during the intervals in which the light beam is intercepted, electric current is produced in the output circuit of the amplifier. The current so produced is utilized to actuate a contact device for closing an electric circuit.

The beam of light may comprise rays not only within the visible spectrum but also ultra violet or infra red rays or the shorter electromagnetic rays such as X-rays and gamma rays. The opaque body may be of any material not transparent to the particular rays and thus when "X" or gamma rays are used it may be, for example, lead.

A specific embodiment of the invention is illustrated in the figures in the drawing as follows:

Fig. 1, a time signal system utilizing a beam of light intercepted by a pendulum to produce electrical pulses.

Figure 2:
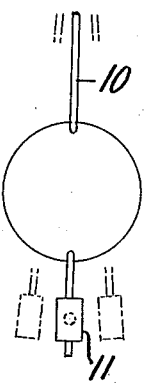

Fig. 2, a view of a portion of the pendulum indicating the movement of the opaque body attached thereto.

In Fig. 1, a pendulum 10 which may be driven by a standard clock mechanism, not shown, is arranged with a plate of opaque material 11 attached to its lower end and adjusted in the path of a beam from the light source 12 directed upon the photo-electric cell 13. The thermionic amplifier 14 comprising a three-element electron discharge tube 15 has included in its input circuit which is connected to the grid and filament of tube 15, the photo-electric cell 13. A battery 16 is connected in series with the cell 13 to supply a biasing potential to the grid of the tube. A grid leak resistance 17 is connected in shunt to both the battery 16 and the cell 13. The output circuit of amplifier 14 is connected to the plate and filament of tube 15 and includes in series a relay 20 and a battery 21. An armature 22 actuated by relay 20 is arranged to close a circuit connected to terminals 23 and 24.

The lens 25 is placed in the path of a beam between light source 12 and photo-electric cell 13 for the purpose of concentrating the light rays upon this cell. A shutter 26 is arranged to exclude extraneous light and to produce a beam of the size desired.

In Fig. 2, a front view of the lower portion of pendulum 10 is shown with the opaque body 11 attached to its lower extremity. The dotted outlines indicate the extreme positions of the opaque body during the oscillation of the pendulum.

In the operation of this system, pendulum 10 is maintained in uniform motion by means of a clock mechanism preferably of such character that the period of the pendulum 10 is maintained constant with a high degree of precision. A beam of light produced by the optical system 12, 25, 26 is directed at right angles to the motion of the pendulum and on to the photo-electric cell 13. This light beam is preferably so positioned as to be intercepted by the opaque body 11 at the midpoint of the swing of pendulum 10. It is thus apparent that for each oscillation of the pendulum, the light falling upon photo-electric cell 13 will be intercepted twice.

While the light is focused on the cell 13, its resistance is lowered to a value such that the grid of the vacuum tube 15 is charged negatively by the battery 16. The value of this negative charge is preferably adjusted so that the grid prevents the flow of space current. Relay 20, therefore, does not operate and the signal circuit remains open. When the opaque body 11 cuts off the light momentarily, the resistance of cell 13 becomes instantaneously substantially infinite. The charge on the grid of tube 15 leaks off through the grid leak resistance, thereby reducing the negative potential of the grid sufficiently to produce a flow of space current through the tube and the relay. Relay 20 therefore operates and closes the signal circuit connected to terminals 23 and 24. The impulses produced in the circuit connected to contacts 23 and 24 may be utilized for any desired purpose, as for example, to drive secondary standard clocks.

By adjusting the pendulum with respect to the light beam so that the opaque body intercepts the beam at the extremity of the swing only one pulse will be produced for each oscillation of the pendulum.

As is well known by varying the dimensions and weight of the pendulum its frequency of oscillation may be adjusted to any desired value to obtain pulses at longer or shorter intervals. By the adjustment of the width of the opaque body the duration of pulses may also be varied.

Although certain embodiments of this invention have been described herein, it is not intended to limit the scope of its application thereby, since numerous other embodiments will occur to persons skilled in the art.

What is claimed is:

1. A time signal system which comprises a pendulum for intercepting a beam of light at equal time intervals, said pendulum having means for varying the ratio of the time of interception of said beam to the period of oscillation of the pendulum, means sensitive to said light beam comprising a photo-electric cell, and a thermionic amplifier for producing electrical pulses in accordance with the interception of said light beam.

2. A method of producing electrical pulses separated by equal time intervals which comprises producing variations of a light beam, said variations being of constant time period of substantial duration and controlling by the direct action of said light beam the flow of electrons in a space discharge path in accordance with the variations of said beam of light.

3. A time signal system which comprises means for producing a beam of light, means for intercepting said beam at equal intervals of time at a rate below audibility, a photo-electric cell arranged to be sensitized by said beam of light, said photo-electric cell being connected in the input circuit of a thermionic amplifier supplying energy to a relay, whereby variations in said light beam are caused to control the flow of current in said relay.

4. The combination with means for producing electrical pulses of equal duration of a thermionic amplifier having an input circuit and an output circuit, a contact operating mechanism controlled by current in said output circuit and light sensitive means in said input circuit for maintaining said contact operating means normally inoperative, and a mechanical oscillating system having a frequency below audibility for controlling the operation of said contact operating mechanism, said mechanical oscillating system being mechanically and electrically independent of said thermionic amplifier.

5. The combination in a system for producing electrical impulses of an oscillating body having a frequency below audibility arranged to intercept a beam of light, an amplifier controlled by said light beam and means controlled by said amplifier for opening and closing an electric circuit.

6. The method of varying a space discharge of the electrons in a periodic manner which comprises causing a light beam to impinge upon an electron emissive electrode, intermittently interposing an opaque body in the path of the light beam, and controlling the movement of the opaque body by a harmonically vibrating system having a frequency below audibility.

7. A system for determining the frequency of operation of a mechanically operating body which comprises a source of radiant energy, a radiant energy responsive device arranged to receive energy from said source, a pendulum for interrupting the energy supplied to said device, and means whereby said body is operated at each interruption.

In witness whereof, I hereunto subscribe my name this 7th day of November A. D., 1923.

HOMER C. SNOOK.